US012668679B2

(12) United States Patent
Liao et al.

(10) Patent No.: US 12,668,679 B2
(45) Date of Patent: Jun. 30, 2026

(54) DISPOSAL METHOD FOR RECYCLATE CONTAINING POLYESTER

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Mong-Chen Chang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 506 days.

(21) Appl. No.: 18/358,930

(22) Filed: Jul. 25, 2023

(65) Prior Publication Data

US 2024/0417528 A1     Dec. 19, 2024

(30) Foreign Application Priority Data

Jun. 14, 2023     (TW) .................................. 112122111

(51) Int. Cl.
C08J 11/24 (2006.01)
C08J 11/16 (2006.01)
C08J 11/26 (2006.01)

(52) U.S. Cl.
CPC ................ C08J 11/24 (2013.01); C08J 11/16 (2013.01); C08J 11/26 (2013.01); *C08J 2367/02* (2013.01)

(58) Field of Classification Search
CPC ... C08J 11/24; C08J 11/16; C08J 11/26; C08J 2367/02
See application file for complete search history.

(56) References Cited

U.S. PATENT DOCUMENTS

2003/0134915 A1* 7/2003 Scantlebury ......... C08G 63/785
                                                      521/48
2022/0325065 A1* 10/2022 Wolters ................... C07C 67/03

FOREIGN PATENT DOCUMENTS

CN         1585797        2/2005
JP         S-57108126 A  * 6/1982   ............. C08G 63/00
JP         2004189898     7/2004
JP         2005527650     9/2005
JP         2024028086     3/2024
KR         20220051356    4/2022
WO         2022180563     9/2022

OTHER PUBLICATIONS

"Office Action of Taiwan Counterpart Application", issued on Jan. 15, 2024, p. 1-p. 7.
"Notice of allowance of Japan Counterpart Application", issued on May 21, 2025, p. 1-p. 3.

* cited by examiner

*Primary Examiner* — Yate' K Cutliff
(74) *Attorney, Agent, or Firm* — JCIPRNET

(57) ABSTRACT

A disposal method for recyclate of the disclosure including: providing recyclable containing polyester; performing a first depolymerization step, including mixing the recyclable and o-BHET for reaction and extrusion depolymerization to at least obtain or produce p-BHET; and performing a second depolymerization step, including mixing the p-BHET and a depolymerization solution for chemically depolymerization to at least obtain or produce m-BHET.

6 Claims, 1 Drawing Sheet

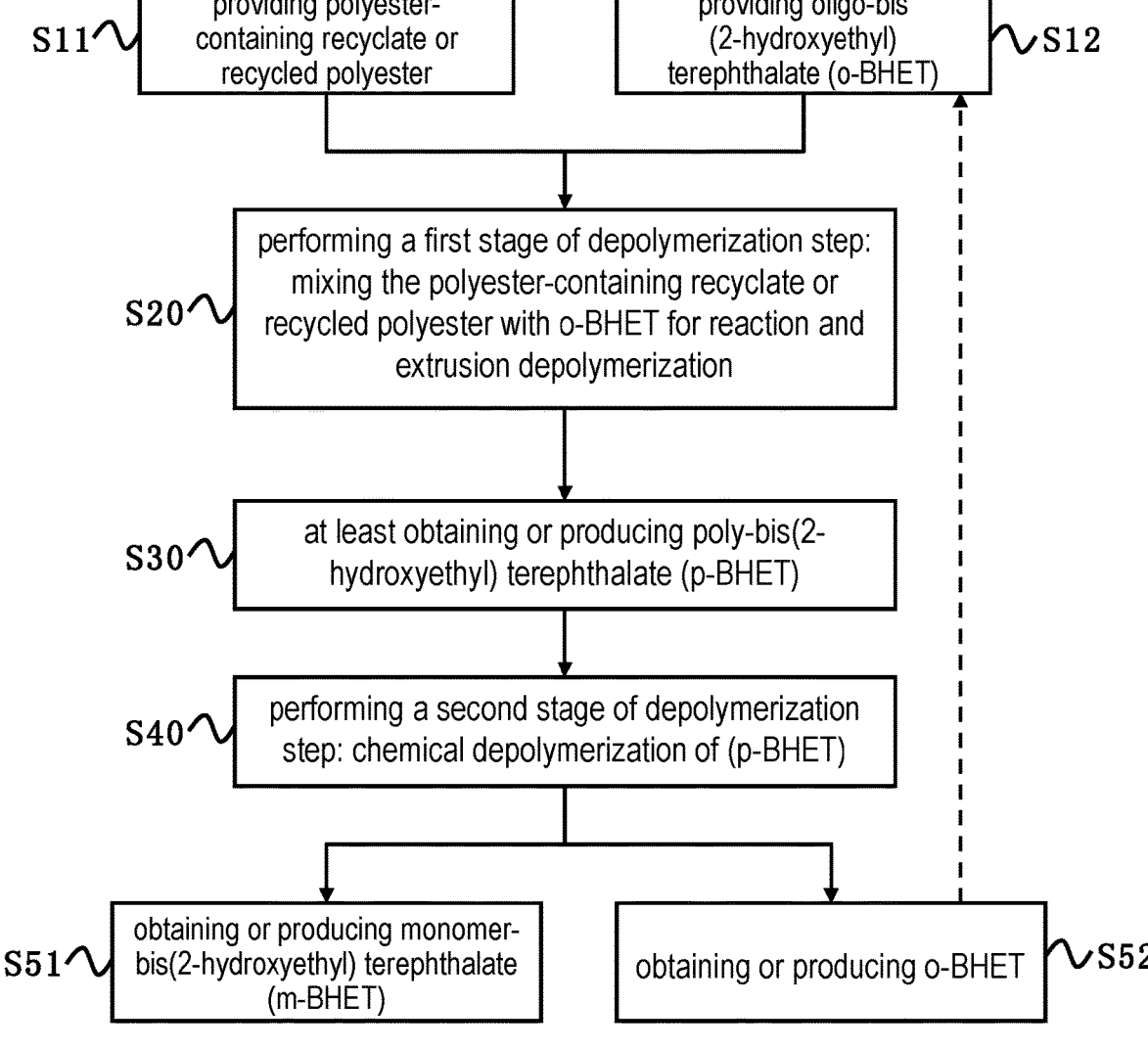

DISPOSAL METHOD FOR RECYCLATE CONTAINING POLYESTER

CROSS-REFERENCE TO RELATED APPLICATION

This application claims the priority benefit of Taiwan application serial no. 112122111, filed on Jun. 14, 2023. The entirety of the above-mentioned patent application is hereby incorporated by reference herein and made a part of this specification.

BACKGROUND

Technical Field

The disclosure relates to a disposal method for recyclate, and more particularly to a disposal method for recyclate containing polyester.

DESCRIPTION OF RELATED ART

Polyester fibers are fabrics commonly seen in the market and our daily lives. For example, polyester fibers could be co-woven with nylon fibers or spandex fibers and then made into all kinds of fabric, such as clothes, shirts, covers, bags, quilts, hats, skirts, mattresses, pants, socks, using conventional approaches in fabric or garment industry. With the awakening environmental awareness of these days, it has become a research in progress to recycle polyester in these fabrics and/or dispose the polyester wastes.

SUMMARY

The disclosure provides a disposal method for recyclate containing polyester.

A disposal method for recyclate of the disclosure including: providing recyclable containing polyester; performing a first depolymerization step, including mixing the recyclable and oligo-bis(2-hydroxyethyl) terephthalate (o-BHET) for reaction and extrusion depolymerization to at least obtain or produce poly-bis(2-hydroxyethyl) terephthalate (p-BHET); and performing a second depolymerization step, including mixing the p-BHET and a depolymerization solution for chemically depolymerization to at least obtain or produce monomer-bis(2-hydroxyethyl) terephthalate (m-BHET).

The totally recycling efficiency and/or recycling rate of polyester of the disclosure could be increased, and further, thereby reducing the recycling cost.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

The FIGURE is a schematic flowchart of a disposal method for recyclate containing polyester according to an embodiment of the disclosure.

DESCRIPTION OF THE EMBODIMENTS

In the following detailed description, for the sake of explanation and not limitation, exemplary embodiments revealing specific details are set forth to provide a thorough understanding of various principles of the disclosure. However, it will be apparent to those skilled in the art that, benefit from the disclosure, the disclosure may be practiced in other embodiments that depart from the specific details disclosed herein. In addition, descriptions of well-known devices, methods, and materials may be omitted so as not to obscure the description of various principles of the disclosure.

In the specification, non-limiting terms (such as about, substantially, basically, essentially, possible, may, for example or other similar terms) are non-essential or optional implementation, inclusion, addition or existence.

A range may be expressed herein as from "about" a specific value to "about" another specific value, and it may also be directly expressed as a specific value and/or to another specific value. When expressing the range, another embodiment includes from the one specific value and/or to another specific value. Similarly, when a value is expressed as an approximation by using the antecedent "about," it will be understood that the specific value forms another embodiment. It will be further understood that an endpoint of each range is apparently related to or independent from another endpoint.

Unless otherwise defined, all terms (including technical terms and scientific terms) used herein have the same meanings as commonly understood by those with ordinary knowledge in the technical field to which the disclosure belongs. It will also be understood that terms (such as those defined in commonly used dictionaries) should be interpreted as having a meaning consistent with the meaning in the relevant technical background and should not be interpreted in an idealized or overly formal sense, unless explicitly defined herein.

[Recycled Material Containing Polyester]

Recycled material (may be referred as: recyclate) containing polyester is provided. In an embodiment, recycled material containing polyester may be referred as polyester-containing recyclate.

In an embodiment, a method of obtaining recyclables may include: collecting various types of recyclables or wastes containing polyester; and performing corresponding sorting according to types, colors, and/or usage purposes of the aforementioned recyclables. The aforementioned recyclables may include, for example, clothing, shirt, cover, bag, quilt, hat, mattress, pant, sock, but the disclosure is not limited thereto. Generally, a label on regular clothing may indicate a used fiber composition.

In an embodiment, the recyclable containing polyester may be further subjected to one of following pre-treatments (i.e., the treatments before subsequent treatment; essentially still recyclable): removing objects (such as: clips, fasteners, ornaments, labels and/or other objects obviously not containing polyester) on the recyclable; performing preliminary cleaning on the recyclable (such as washing stains, throwing off impurities, etc., but the disclosure is not limited thereto); using physical methods (such as: shearing, trimming, cutting or chopping, but the disclosure is not limited thereto) to reduce a single size of the recyclable; and/or, drying the recyclable.

In an embodiment, a method of obtaining the recyclable may include, for example, directly purchasing the processed polyester-containing recyclable.

It should be noted that the term "polyester" in the specification includes polymers commonly referred to as polyesters, particularly aromatic polyesters, and particularly refers to polyesters derived from purified terephthalic acid (PTA) and ethylene glycol (EG) (i.e., polyethylene terephthalate (PET)).

Additionally, a polyester in the specification may also be, for example, polytrimethylene terephthalate, polybutylene terephthalate, polyethylene naphthalate, or a combination of the above materials. In the embodiment, the polyester is preferably polyethylene terephthalate, polytrimethylene terephthalate or a combination thereof. In addition, a copolymer may also be used, which specifically refers to a copolymer that may be obtained by using two or more dicarboxylic acids and/or two or more diol components.

In an embodiment, the dyes used in the fabric are mostly organic dyes. For example, azo dyes (such as monoazo dyes or disazo dyes) are commonly used to dye polyester. The adhesion of organic dyes to polymers is generally better. Note that the disclosure does not limit the types of the organic dyes.

In an embodiment, the dyes used in the fabric do not contain inorganic dyes as most inorganic dyes contain a heavy metal element, which may easily cause allergies or discomfort to the human body.

In an embodiment, based on the total weight of the fabric, the weight ratio of the dye to the whole fabric is substantially less than 10 wt %.

In an embodiment, based on the total weight of the fabric, the weight ratio of polyester to the whole fabric is greater than or substantially equal to 90 wt %.

[Pre-Treatment of Recyclate Containing Polyester]

In an embodiment, an appropriate size of recyclate may be selected by a suitable method (such as: screening with a sieve or classification with an air classifier, but the disclosure is not limited thereto) for a subsequent reproducing step.

In an embodiment, the appropriate size of the recyclate may be determined or confirmed by a suitable method (such as: a weighing method exemplary by a balance).

In an embodiment, a weighing method for determining or confirming the appropriate size of the recyclate may include, for example, using 2 grams as a unit, if the number of particles of the recyclate is greater than or equal to 50, it may be determined or confirmed as recyclate with the appropriate size.

In an embodiment, before the subsequent reproducing step being proceeded, the recyclate may be performed to have an appropriate size by a physical method (such as: cutting, trimming, slicing, or chopping, but the disclosure is not limited thereto).

[Reproducing Step of Recyclate Containing Polyester]

The FIGURE is a schematic flowchart of a disposal method for recyclate containing polyester according to an embodiment of the present disclosure. As shown in the FIGURE, the process of the method for processing recyclate containing polyester may include the following steps.

Step S11: polyester-containing recyclate or recycled polyester is provided.

Step S12: oligo-bis(2-hydroxyethyl) terephthalate (o-BHET) is provided.

Step S20: a first depolymerization step is performed. The first stage includes a process of mixing the polyester-containing recyclate or recycled polyester with o-BHET for reaction and extrusion depolymerization.

Step S30: at least poly-bis(2-hydroxyethyl) terephthalate (p-BHET) is obtained or produced.

Step S40: a second depolymerization step is performed. The first stage includes a process of performing chemical depolymerization of poly-bis(2-hydroxyethyl) terephthalate (p-BHET).

Step S51: monomer-bis(2-hydroxyethyl) terephthalate (m-BHET) is obtained or produced.

Step S52: oligo-bis(2-hydroxyethyl) terephthalate (o-BHET) is obtained or produced.

In an embodiment, the o-BHET obtained or produced in step S52 may further be used for a subsequent step the same or similar to the step of S12.

In particular, the process of the method for processing recyclate containing polyester may sequentially include the first depolymerization step and the second depolymerization step, the detailed descriptions of which are as follows.

[The First Depolymerization Step]

The recyclate containing polyester or recycled polyester may be fed into an extruder for extrusion, so that the polyester therein could be depolymerized by a reaction during extrusion. As such, the depolymerization may be referred as a reaction and extrusion depolymerization.

The extruder may be, for example, a commercially available single screw extruder (SSE), twin screw extruder (TSE), or another similar screw extruder, but the disclosure is not limited thereto. In addition, the disclosure does not describe in detail the structure and/or operation of a commercially available screw extruder.

In an embodiment, o-BHET may be fed into the extruder to enhance the depolymerization rate and/or quality of polyester fed into the extruder.

In an embodiment, the aforementioned o-BHET may be, for example, a polymer of 2 to bis(2-hydroxyethyl) terephthalate (BHET) monomers. The corresponding number of monomer units of o-BHET may be calculated or estimated by an appropriate method (e.g., calculated or estimated from a corresponding molecular weight).

In an embodiment, the BHET may be one of the raw materials for polyester (e.g., polyethylene terephthalate; PET). Therefore, the addition of BHET or an oligomer thereof (e.g., o-BHET) basically will not affect the recycled polyester from the recyclate containing polyester (e.g., a side reaction product and/or impurities); or, the side reaction product and/or impurities may be reduced.

In an embodiment, the o-BHET may be obtained or produced from another or a corresponding recycling step.

In an embodiment, the BHET or the oligomer thereof may be obtained or produced from an esterification reaction of terephthalic acid (PTA) and ethylene glycol (EG).

In an embodiment, during the process of depolymerizing the polyester by the reaction during extrusion, essentially no ethylene glycol (EG) is added or fed into the extruder.

The boiling point of o-BHET is higher than the boiling point of BHET and EG (about 197° C. or 387° F.). Therefore, in an embodiment, compared to feeding m-BHET or EG into the extruder, feeding o-BHET into the extruder may be safer and/or simpler for the reproducing process (e.g., the extrusion process) and/or the corresponding equipment (e.g., the extruder). For example, compared to a method of feeding m-BHET or EG, feeding o-BHET into the extruder may not require providing additional back pressure or reducing a back pressure of the extruder.

In an embodiment, the boiling point of o-BHET may be greater than or equal to about 250° C. or 482° F.

In an embodiment, based on the total weight of the material fed into the extruder, the weight ratio of o-BHET in the material fed into the extruder is basically about 5 wt % to 20 wt %; more preferably, about 10 wt % to 15 wt %.

In an embodiment, a corresponding catalyst may be fed into the extruder to enhance the depolymerization rate of polyester fed into the extruder.

In an embodiment, the aforementioned catalyst may include an organometallic compound.

In an embodiment, the organometallic compound as the aforementioned catalyst may include organozinc (such as zinc acetate), organocobalt (such as cobalt acetate), organotitanium (such as an alkoxide titanium salt), organoantimony (such as antimony acetate), organoaluminum (such as aluminum formate, aluminum acetate, aluminum propionate, and another organic acid aluminum compound) or a combination thereof.

In an embodiment, based on the total weight of the material fed into the extruder, the weight ratio of the catalyst in the material fed into the extruder is basically about 0.2 wt % to 8 wt %; more preferably, about 0.5 wt % to 5 wt %.

In an embodiment, based on the total weight of the recyclate containing polyester, o-BHET, and catalyst fed into the extruder, the weight ratio of o-BHET in the aforementioned three materials fed into the extruder is basically about 5 wt % to 20 wt %; more preferably, about 10 wt % to 15 wt %.

In an embodiment, based on the total weight of the recyclate containing polyester, o-BHET, and catalyst fed into the extruder, the weight ratio of the catalyst in the aforementioned three materials fed into the extruder is basically about 0.2 wt % to 8 wt %; more preferably, about 0.5 wt % to 5 wt %.

If the relative amount of the aforementioned o-BHET is too low (e.g., less than 5 wt %) and/or the relative amount of the catalyst is too low (e.g., less than 0.2 wt %), it may reduce the depolymerization efficiency and/or depolymerization amount, thereby the subsequent processing efficiency may be reduced and/or the final relative recycling amount may be decreased.

If the relative amount of the aforementioned o-BHET is too high (e.g., greater than 20 wt %), although the depolymerization ratio of the target depolymerized material may be slightly increased, it may reduce the overall depolymerization amount conversely, thereby increasing the recycling cost.

If the relative amount of the aforementioned catalyst is too high (e.g., greater than 8 wt %), although the depolymerization ratio of the target depolymerized material may be slightly increased, it may require more catalyst, reduce the overall depolymerization amount, and/or increase the difficulty of subsequent catalyst treatment (e.g., catalyst separation) conversely, thereby increasing the recycling cost.

In an embodiment, at least one feeder (e.g., a side feeder) may be attached to the extruder. The feeder may be a loss-in-weight feeder equipped with a loss-in-weight scale. The aforementioned feeder is also a common commercially available module and/or optional accessory. In other words, the various materials (e.g., recyclate containing polyester; and further o-BHET and/or catalyst) may be mixed before feeding, or they may be fed into the extruder through different feeders and mixed within the extruder.

In an embodiment, the mixture inside the extruder may basically undergo a corresponding homogeneous reaction. In this way, a process or reaction bottleneck caused by the corresponding mass transfer may be reduced.

In an embodiment, the extruder may have a heating zone. In this way, after the recycle containing polyester is fed into the extruder, the polyester-containing mixture inside the extruder may be correspondingly extruded and heated to depolymerize through a thermo-extrusion or thermo-compression reaction, and then extruded or pressed out. In an embodiment, the heating temperature of the heating zone may be between about 200~280° C.; more preferably, about 220~260° C.

In an embodiment, the polyester depolymerization reaction time during extrusion (may be referred as: extrusion time) may be about 1 minute to 10 minutes; more preferably, about 2 minutes to 5 minutes.

In an embodiment, the polyester depolymerization reaction time during extrusion (may be referred as: extrusion time) by heat may be about 1 minute to 10 minutes; more preferably, about 2 minutes to 5 minutes; wherein the heating temperature may be between about 200° C. to 280° C.; more preferably, about 220° C. to 260° C.

If the aforementioned extrusion time is too short (e.g., less than 1 minute) and/or the heating temperature is too low (e.g., less than 200° C.), it may reduce the depolymerization efficiency and/or relative depolymerization ratio, thereby the subsequent processing efficiency may be reduced and/or the final relative recycling amount may be decreased.

If the aforementioned depolymerization time is too long (e.g., greater than 10 minutes) and/or the heating temperature is too high (e.g., greater than 280° C.), it may increase a relative ratio of side reaction product or impurity, thereby the subsequent processing efficiency may be reduced and/or the final relative recycling amount may be decreased.

In an embodiment, the first depolymerization step may depolymerize most of the polyester in the recycled material to poly-bis(2-hydroxyethyl) terephthalate (p-BHET). Compared to o-BHET, p-BHET contains more BHET monomer unit, but p-BHET is substantially insufficient to form fibers or polymers suitable for an appropriate application.

In an embodiment, the aforementioned p-BHET is, for example, a polymerization of about 10 to 100 BHET monomers (e.g., 10 to 100 BHET monomer unit). The corresponding number of monomer units of p-BHET may be calculated or estimated by an appropriate method (e.g., calculated or estimated from a corresponding molecular weight).

[The Second Depolymerization Step]

The second depolymerization step is preformed after the first depolymerization step.

The second depolymerization step may include a chemical depolymerization process. For example, the p-BHET obtained from the first depolymerization step may be introduced into a depolymerization tank along with the depolymerization liquid for chemical depolymerization.

The chemical depolymerization solution may basically break the polymer chain of p-BHET for further depolymerization. As such, it may be possible to obtain a shorter polyester-chain compound (e.g., o-BHET) and an ester monomer composed of dicarboxylic acid unit and diol (e.g., m-BHET). In other words, the average molecular weight of the mixture after chemical depolymerization is essentially lower than the average molecular weight of the mixture (mostly p-BHET) obtained from the first depolymerization step.

The disclosure does not limit the type of depolymerization liquid. For example, hydrolysis may be performed by using water. For example, alcoholysis may be performed by using alcohols (e.g., methanol, ethanol, ethylene glycol, diethylene glycol, or a mixture thereof). In an embodiment, the depolymerization liquid is preferably an alcohol. The depolymerization liquid is more preferably EG, a reason may be that EG may serve as a reaction monomer for producing virgin polyester chips (virgin PET chips).

In an embodiment, based on the total weight of the reaction materials participating in the depolymerization reaction (e.g., p-BHET obtained from the first depolymerization step and ethylene glycol for the chemical depolymerization process), the weight ratio of EG is basically about 30 wt % to 80 wt %; more preferably, about 40 wt % to 70 wt %.

If the relative amount of ethylene glycol is too low (e.g., less than 30 wt %), it may reduce the depolymerization efficiency and/or depolymerization amount, thereby the subsequent processing efficiency may be reduced and/or the final relative recycling amount may be decreased.

If the relative amount of ethylene glycol is too high (e.g., greater than 80 wt %), although the depolymerization ratio of the target depolymerized material may be slightly increased, it may require more ethylene glycol and/or reduce the overall depolymerization amount conversely, thereby increasing the recycling cost.

During the chemical depolymerization reaction, an appropriate heating step may be performed. An increase in temperature typically increases the rate of chemical reaction. For example, after introducing the p-BHET obtained from the first depolymerization step and ethylene glycol into the depolymerization tank, an alcoholysis reaction may be preformed at a temperature of 190° C. to 240° C. for about 0.5 hours to 5 hours; more preferably, an alcoholysis reaction may be performed at a temperature of 200° C. to 230° C. for about 1 hour to 3 hours.

If the aforementioned chemical depolymerization time is too short (e.g., less than 0.5 hours) and/or the heating temperature is too low (e.g., less than 190° C.), it may reduce the depolymerization efficiency and/or depolymerization amount, thereby the subsequent processing efficiency may be reduced and/or the final relative recycling amount may be decreased.

If the aforementioned chemical depolymerization time is too long (e.g., greater than 5 hours) and/or the heating temperature is too high (e.g., greater than 240° C.), although the depolymerized ratio may be slightly increase, more time or cost (e.g. thermal energy) is required since most of the p-BHET has been depolymerized to m-BHET.

[Separation of the Products of the Aforementioned Depolymerization Step]

The depolymerization products after performing the second depolymerization step may include a shorter polyester-chain compound (e.g., o-BHET) and an ester monomer composed of dicarboxylic acid unit and diol (e.g., m-BHET). The ester monomer and the shorter polyester-chain compound may be separated by an appropriate purification method (e.g., crystallization, activated carbon adsorption, filtration, and/or drying).

EXAMPLE AND COMPARATIVE EXAMPLE

The following examples and comparative example are shown to describe the disclosure, but not to limit the disclosure.

Example 1

Approximately 90 kilograms (kg) of recyclate containing polyester (e.g., waste PET fabrics, may be referred as "PET" in [Table 1]) is provided. The aforementioned recyclate containing polyester is mixed with about 10 kg of o-BHET and about 0.3 kg of zinc acetate (which may be referred as a catalyst), and then fed into a twin-screw extruder for extrusion and pre-depolymerization. The heating temperature of the extruder is set at about 260° C. The extruded p-BHET (may be referred as "ext-PROD" in [Table 1]) then enters a stirring tank, and an additional about 400 kg of EG and about 0.2 kg of zinc acetate (which may be referred as a catalyst) are added, and the reaction continues at about 190° C. to 200° C. (e.g., about 195° C. to 198° C.) for about 180 minutes to depolymerize into a crude product. The crude product comprises o-BHET and m-BHET.

After depolymerization, the crude product is cooled to about room temperature (e.g., denoted as: 198 ↘ 25° C.), and the o-BHET and m-BHET are crystallized and filtered out. Subsequently, after mixing the aforementioned filtered crystals with hot water at 90° C., the o-BHET is essentially insoluble and may be filtered out for reuse of extrusion and pre-depolymerization; the m-BHET, which is essentially soluble in 90° C. hot water, may be purified by removing impurities using activated carbon or another suitable adsorbent material. Afterwards, the purified 90° C. solution containing m-BHET is cooled to about 5° C., causing the m-BHET dissolved therein to crystallize and precipitate, and after filtration and drying, the corresponding m-BHET is obtained.

Finally, based on the weight of the polyester in the original recyclate containing polyester, the weight ratio of the m-BHET product is approximately 80.6 wt %. That is, the recycling rate of polyester is approximately 80.6 wt %.

In the aforementioned method, the depolymerization reaction during extrusion (that is, the first depolymerization step, may be referred as a pre-depolymerization step) of the recyclate containing polyester and the o-BHET may be a homogeneous reaction in an approximate molten state. Additionally, after the aforementioned pre-depolymerization step, the extruded p-BHET may be essentially soluble in EG at about 190° C. to 200° C. (e.g., 195° C. to 198° C.), thus the chemical depolymerization process (that is, the second depolymerization step) of the p-BHET and the EG may be a liquid homogeneous reaction. By a corresponding reaction under a corresponding homogeneous condition, the totally recycling efficiency and/or recycling rate of polyester could be increased.

Example 2, Example 3, and Example 4

<Example 2>, <Example 3>, and <Example 4> may be performed in a manner similar to <Example 1>, with a significant difference being in: a ratio or amount of the o-BHET for the pre-depolymerization step, a ratio or amount of zinc acetate (may be referred as "ZnAc" in [Table 1]) for the corresponding depolymerization step, a corresponding reaction temperature (may be referred as "temp" in [Table 1]) and/or a corresponding reaction time (may be referred as "time" in [Table 1]).

The corresponding conditions/parameters and results for <Example 2>, <Example 3>, and <Example 4> are as shown in [Table 1].

TABLE 1

| Conditions/parameters of the depolymerization step | | | Example 1 | Example 2 | Example 3 | Example 4 |
|---|---|---|---|---|---|---|
| 1st | PET | kg | 90 | 89 | 81 | 88 |
| | o-BHET | kg | 10 | 6 | 18 | 12 |
| | ZnAc | kg | 0.3 | 1.5 | 1.0 | 0.5 |
| | temp | ° C. | 260 | 230 | 250 | 270 |
| | time | min | 5 | 3 | 8 | 6 |

TABLE 1-continued

| Conditions/parameters of the depolymerization step | | Example 1 | Example 2 | Example 3 | Example 4 |
|---|---|---|---|---|---|
| $2^{nd}$ ext-PROD | kg | 100.3 | 100.0 | 100.0 | 100.2 |
| EG | kg | 400 | 400 | 400 | 400 |
| ZnAc | kg | 0.2 | 0.1 | 0.1 | 0.2 |
| temp | ° C. | 195 | 205 | 220 | 230 |
| time | min | 180 | 150 | 120 | 120 |
| initial reaction state | | liquid-liquid (solution) | | | |
| weight ratio (%) of the m-BHET product | | 80.6 | 82.3 | 81.9 | 84.0 |

Comparative Example 1

Approximately 100 kilograms (kg) of recyclate containing polyester (e.g., waste PET fabrics, may be referred as "PET" in [Table 2]) is provided. The aforementioned recyclate containing polyester is entered into a stirring tank, and erogeneous reaction. As a result, the totally recycling efficiency and/or recycling rate of polyester may be reduced or decreased.

Comparative Example 2, Comparative Example 3, and Comparative Example 4

<Comparative Example 2>, <Comparative Example 3>, and <Comparative Example 4> may be performed in a manner similar to <Comparative Example 1>, with a significant difference being in: a ratio or amount of zinc acetate (may be referred as "ZnAc" in [Table 2]) for the corresponding depolymerization step, a corresponding reaction temperature (may be referred as "temp" in [Table 2]) and/or a corresponding reaction time (may be referred as "time" in [Table 2]).

TABLE 2

| Conditions/parameters of the depolymerization step in tank | | Comparative Example 1 | Comparative Example 2 | Comparative Example 3 | Comparative Example 4 |
|---|---|---|---|---|---|
| PET | kg | 100.3 | 100.0 | 100.0 | 100.2 |
| EG | kg | 400 | 400 | 400 | 400 |
| ZnAc | kg | 0.5 | 1.6 | 1.1 | 0.7 |
| temp | ° C. | 195 | 205 | 220 | 230 |
| time | min | 180 | 240 | 240 | 240 |
| initial reaction state | | solid-liquid (slurry) | | | |
| weight ratio (%) of the m-BHET product | | 67.4 | 72.4 | 74.7 | 73.0 | an additional about 400 kg of EG and about 0.5 kg of zinc acetate are added, and the reaction continues at about 190° C. to 200° C. (e.g., about 195° C. to 198° C.) for about 180 minutes to depolymerize into a crude product. The crude product comprises o-BHET and m-BHET.

After depolymerization, the crude product is cooled to about room temperature (e.g., denoted as: 198 ↘ 25° C.), and the o-BHET and m-BHET are crystallized and filtered out. Subsequently, after mixing the aforementioned filtered crystals with hot water at 90° C., the o-BHET is essentially insoluble and may be filtered out; the m-BHET, which is essentially soluble in 90° C. hot water, may be purified by removing impurities using activated carbon or another suitable adsorbent material. Afterwards, the purified 90° C. solution containing m-BHET is cooled to about 5° C., causing the m-BHET dissolved therein to crystallize and precipitate, and after filtration and drying, the corresponding m-BHET is obtained.

Finally, based on the weight of the polyester in the original recyclate containing polyester, the weight ratio of the m-BHET product is approximately 67.4 wt %. That is, the recycling rate of polyester is approximately 67.4 wt %.

In the aforementioned method, the recyclate containing polyester may be difficult or even impossible to dissolve in EG at about 190° C. to 200° C. (e.g., 195° C. to 198° C.). Therefore, the initial reaction state of the corresponding depolymerization reaction is essentially a solid-liquid het-

[Utilization of Products after Depolymerization]

A corresponding recycled polyester (recycle-PET, r-PET) could be obtained by a commonly synthesis method (e.g., an esterification and/or polymerization reaction) from the ester monomer composed of dicarboxylic acid unit and diol (e.g., m-BHET) obtained by the aforementioned disposal method.

A shorter polyester-chain compound (e.g., o-BHET) may be purified by an appropriate method (e.g., crystallization, activated carbon adsorption, filtration, and/or drying) to remove or reduce impurity (e.g., dyes or their derivatives, salts; but not limited to); then, the purified shorter polyester-chain compound may be used in a subsequent recycling step for a disposal method for recyclate containing polyester (e.g., the same or similar to the aforementioned first depolymerization step).

[An Unexpected Result]

The disposal method of the disclosure includes the aforementioned first depolymerization step (including a reaction during extrusion) for depolymerizing the recyclate containing polyester to p-BHET; and then, the aforementioned second depolymerization step (including a chemical depolymerization reaction) for depolymerizing the aforementioned p-BHET to m-BHET. In this way, the totally recycling efficiency and/or recycling rate of polyester could be increased, and further, thereby reducing the recycling cost.

Compared to a directly disposal method (e.g., an only-chemical depolymerization as shown in the aforementioned comparative example), the totally recycling efficiency and/or recycling rate of polyester of the disclosure may be higher, and further, the recycling cost may be further lower. For example, a disposal method for recyclate containing polyester only by chemical depolymerization may require a longer depolymerization time, may require a larger amount of depolymerization solution, and/or may generate more impurities. The reason may be that the polyester chain length of the recyclate is longer and/or the long-chain polyester is difficult to dissolve in EG.

In addition, if the disposal method of the disclosure is performed by multiple cycles or times, the o-BHET produced or obtained in the second depolymerization step of the previous cycle or time (not limited to the last cycle or time; e.g., it may include the last cycle or time, an earlier cycle or time, or multiple earlier cycles or times) may be utilized in the first depolymerization step of the subsequent treatment (not limited to the next cycle or time; e.g., it may include the next cycle or time, a later cycle or time, or multiple later cycles or times). In this way, the totally recycling efficiency and/or recycling rate of polyester could be increased, and further, thereby reducing the totally recycling cost.

INDUSTRIALLY APPLICABLE

By using the disposal method of the disclosure, polyester in the recyclable (e.g., recycled fabrics) may be recycled. Moreover, the recycled polyester may be reused. The reuse methods include, but are not limited to: the manufacture of fabrics, containers, sheets, packaging materials, films, and other polyester-containing objects.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A disposal method for recyclate, comprising:
   providing recyclable containing polyester;
   performing a first depolymerization step, comprising mixing the recyclable and oligo-bis(2-hydroxyethyl) terephthalate (o-BHET) for reaction and extrusion depolymerization to at least obtain or produce poly-bis(2-hydroxyethyl) terephthalate (p-BHET); and
   performing a second depolymerization step, comprising mixing the p-BHET and a depolymerization solution for chemically depolymerization to at least obtain or produce monomer-bis(2-hydroxyethyl) terephthalate (m-BHET), wherein:
   the first depolymerization step further comprises mixing the recyclable, the o-BHET, and a catalyst;
   the first depolymerization step further comprises heating to 200° C. to 280° C.;
   the depolymerization solution comprises ethylene glycol, and a weight ratio of the ethylene glycol in a total weight of the mixture in the second depolymerization step is 30 wt % to 80 wt %; and
   the second depolymerization step further comprises heating to 190° C. to 240° C.

2. The disposal method for recyclate according to claim 1, wherein a weight ratio of the o-BHET in a total weight of the mixture in the first depolymerization step is 5 wt % to 20 wt %.

3. The disposal method for recyclate according to claim 1, wherein a weight ratio of the catalyst in a total weight of the mixture in the first depolymerization step is 0.2 wt % to 8 wt %.

4. The disposal method for recyclate according to claim 1, wherein the first depolymerization step is performed for 1 minute to 10 minutes.

5. The disposal method for recyclate according to claim 1, wherein the second depolymerization step is performed for 0.5 hours to 5 hours.

6. The disposal method for recyclate according to claim 1, wherein:
   the first depolymerization step is performed at least M times or cycles, the second depolymerization step is performed at least N times or cycles, where M and N are both natural numbers, and M is greater than N; and
   the o-BHET used for mixing in the $M^{th}$ time or cycle of the first depolymerization step comprises the o-BHET obtained or produced from the $N^{th}$ time or cycle of the second depolymerization step.

* * * * *